(12) United States Patent
Hillman et al.

(10) Patent No.: US 7,508,256 B2
(45) Date of Patent: Mar. 24, 2009

(54) INTEGRATED CIRCUIT WITH SIGNAL BUS FORMED BY CELL ABUTMENT OF LOGIC CELLS

(75) Inventors: Daniel L. Hillman, San Jose, CA (US); William G. Walker, Saratoga, CA (US)

(73) Assignee: MOSAID Technologies Corporation, Santa Clara, CA (US)

( * ) Notice: Subject to any disclaimer, the term of this patent is extended or adjusted under 35 U.S.C. 154(b) by 249 days.

(21) Appl. No.: 11/433,158

(22) Filed: May 12, 2006

(65) Prior Publication Data

US 2006/0261855 A1 Nov. 23, 2006

Related U.S. Application Data

(60) Provisional application No. 60/680,888, filed on May 13, 2005.

(51) Int. Cl.
*H01L 25/00* (2006.01)
(52) U.S. Cl. .................................... 327/565
(58) Field of Classification Search ........ 327/534, 327/564, 565, 566
See application file for complete search history.

(56) References Cited

U.S. PATENT DOCUMENTS

| | | | | |
|---|---|---|---|---|
| 5,387,813 A | * | 2/1995 | Iranmanesh et al. | 257/563 |
| 5,486,774 A | * | 1/1996 | Douseki et al. | 326/33 |
| 6,154,091 A | * | 11/2000 | Pennings et al. | 327/565 |
| 6,486,703 B2 | | 11/2002 | Noble et al. | |
| 6,819,136 B2 | | 11/2004 | Or-Bach | |
| 6,831,483 B2 | * | 12/2004 | Shimazaki et al. | 326/121 |
| 6,864,539 B2 | * | 3/2005 | Ishibashi et al. | 257/368 |
| 6,987,415 B2 | * | 1/2006 | Mizuno et al. | 327/534 |
| 7,176,745 B2 | * | 2/2007 | Itoh et al. | 327/534 |
| 7,190,209 B2 | * | 3/2007 | Kang et al. | 327/534 |
| 7,312,640 B2 | * | 12/2007 | Horiguchi et al. | 326/112 |
| 2001/0002109 A1 | | 5/2001 | Noble et al. | |

OTHER PUBLICATIONS

PCT/US06/18409, International Search Report and Written Opinion, 5 pages, Dec. 20, 2007.

* cited by examiner

*Primary Examiner*—Jeffrey S Zweizig
(74) *Attorney, Agent, or Firm*—Dennis R. Haszko

(57) ABSTRACT

An integrated circuit with a signal bus formed by the cell abutment of logic cells. The integrated circuit comprises at least two logic cells. The signal bus is formed by cell abutment of the at least two logic cells. The signal bus is configured to receive a signal and to distribute the signal to each of the at least two logic cells.

23 Claims, 7 Drawing Sheets

INTEGRATED CIRCUIT WITH SIGNAL BUS FORMED BY CELL ABUTMENT OF LOGIC CELLS

CROSS-REFERENCE TO RELATED APPLICATIONS

This application claims the benefit of U.S. Provisional Application Ser. No. 60/680,888 titled "Integrated Circuit Layout with Sleep Transistors," filed May 13, 2005, which is hereby incorporated by reference.

BACKGROUND

1. Field of the Invention

The present invention relates generally to integrated circuits, and more particularly to an integrated circuit with a signal bus formed by cell abutment of logic cells.

2. Description of Related Art

Many designs for integrated circuits use standard cell libraries. The standard cell libraries provide the building blocks of logic cells to allow designers to go quickly from circuit design to semiconductor chip fabrication and test. Metal interconnects are employed to connect signals to each of the logic cells in an integrated circuit.

One example using metal interconnects to distribute a signal to logic cells is a sleep signal for sleep transistors. Sleep transistors have been added to the functionality of logic cells available in standard cell libraries. The sleep transistors are controlled by the sleep signal and provide the ability to control power consumption in the individual logic cells.

A sleep signal may be used by sleep transistors to switch the individual logic cells into sleep mode. In sleep mode, the power consumption of the individual logic cells is reduced. Sleep transistors may be particularly important in devices using integrated circuits in which lower power consumption is an important feature as, for example, in cell phones or mobile computers.

Because space in an integrated circuit is limited, the space occupied by the sleep transistors and related circuitry needs to be minimized. The addition of the sleep transistors to standard cells has caused the height of the logic cell to increase. The added sleep transistors also require additional routing resources, which are limited due to the preexisting design of the integrated circuit layout. A separate sleep pin is also required to receive the sleep signal in each individual logic cell with a sleep transistor. Thus, the addition of sleep transistors to standard cells has resulted in increased complexity that may result in layout congestion and blockages.

FIG. 1 is an illustration of integrated circuit layout 100 employing sleep circuitry in the prior art. Integrated circuit layout 100 includes four logic cells 111, 112, 113 and 114. Integrated circuit layout 100 also includes VDD power bus 120, VDD tap 125, VSS power bus 130, VSS tap 135, sleep pin 140, sleep transistor 150, and gate 160. Integrated circuit layout 100 has height 180.

Logic cell 111 draws its power from VDD power bus 120, and from VSS power bus 130 as controlled by sleep transistor 150. Logic cell 111 comprises sleep transistor 150 and gate 160 coupled to sleep pin 140. Sleep transistor 150 may be configured to switch VSS power to the logic cell 111 on and off in response to a sleep signal received at sleep pin 140, and thereby to control power consumption in logic cell 111.

Each logic cell 111, 112, 113, and 114 contains sleep circuitry comprising a sleep transistor substantially similar to sleep transistor 150. Sleep pin 140 requires a metal layer and a second metal interconnect drop using a via to connect the sleep pins from each logic cell 111, 112, 113, and 114, thus requiring two routing resources, the metal layer and the metal interconnect. In addition, logic cells may be defined in increments of tracks, such that when routing metal interconnects the number of tracks is a whole number. In FIG. 1, the addition of sleep circuitry requires an additional track for routing the metal interconnect, resulting in an increase in height 180 and area of the logic cells 111, 112, 113, and 114 by approximately 11%.

In another example, Multi-Threshold Complementary Metal Oxide Semiconductor (MTCMOS) integrated circuits use one or more sleep transistors located in one region of an integrated circuit. A virtual ground from a plurality of logic cells is routed to the drains of the sleep transistors, thus controlling the power for the plurality of logic cells. MTCMOS suffers, however, from the phenomena of electro-migration. Since the virtual ground carries a pulsed direct current, electro-migration limits the long-term reliability of the integrated circuit. In addition, the use of virtual ground typically requires another track of height in the cell.

Thus, adding sleep circuitry comprising sleep transistors to the individual logic cells in the standard cell libraries has several disadvantages. The disadvantages include increasing the height of the logic cells, the addition of a metal layer, the congestion and resulting difficulty of routing to the sleep pin in each logic cell, and the problem of electro-migration in the MTCMOS example.

SUMMARY OF THE INVENTION

The invention addresses the problems discussed above by providing an integrated circuit with a signal bus formed by the cell abutment of logic cells. The integrated circuit comprises at least two logic cells. The signal bus is formed by the cell abutment of the at least two logic cells. The signal bus is configured to receive a signal and distribute the signal to each of the at least two logic cells.

The signal bus may be formed from a first semiconductor layer comprising a polycrystalline silicon layer. The signal bus may comprise a sleep bus that distributes a sleep signal to each of the at least two logic cells. A sleep pin may be coupled to the sleep bus and may receive the sleep signal. Sleep circuitry may be coupled to the logic cells and may receive the sleep signal from the sleep bus and may control power consumption in the logic cells based on the sleep signal. The sleep circuitry may comprise one or more sleep transistors. The drain of the sleep transistors may be formed from a second semiconductor layer. The sleep transistors may comprise NMOS transistors or PMOS transistors.

Various embodiments of the invention include a method comprising receiving a signal using a signal bus formed by cell abutment of at least two logic cells, and distributing the signal to each of the at least two logic cells.

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

The integrated circuit comprises at least two logic cells and a signal bus formed by the cell abutment of the at least two logic cells. The signal bus is configured to receive a signal and to distribute the signal to each of the at least two logic cells. One advantage is that the signal bus may provide an overall reduction in the area of the logic cells. A second advantage is the uncomplicated routing of the signal bus during the integrated circuit design process. A third advantage is that the performance of the logic cells using a signal bus formed by cell abutment is not degraded.

A signal bus formed by cell abutment comprises circuitry formed by coupling of adjacent logic cells at the edge of the logic cells. When logic cells are fabricated, these abutment regions may be joined by a single semiconductor layer, such as a polycrystalline silicon layer, that spans across a plurality of logic cells. A signal bus thus formed may distribute a signal to each logic cell over which the polycrystalline silicon layer passes.

Using cell abutment of the logic cells, various signals may be distributed through the signal bus to the logic cells. One example of the signal bus is a sleep bus. FIGS. 2 through 7 and the related descriptions disclose distributing a sleep signal using a sleep bus. However, one skilled in the art should understand that other embodiments include distributing other signals using a signal bus.

Figure 2:
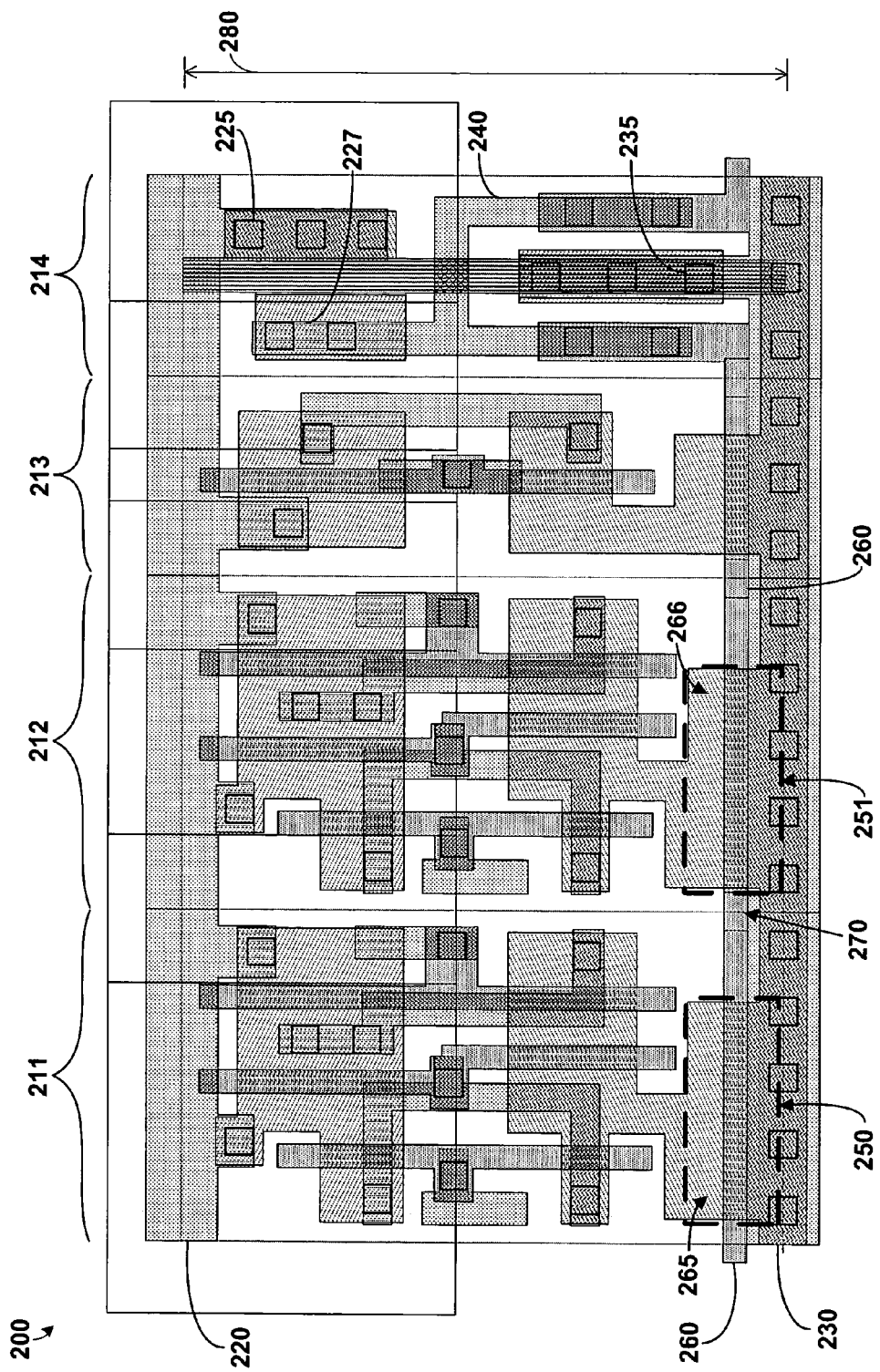
FIG. 2 is an illustration of an integrated circuit layout employing sleep circuitry in an exemplary implementation of the invention.

FIG. 2 is an illustration of an integrated circuit layout 200 employing sleep circuitry in an exemplary implementation of the invention. The integrated circuit layout 200 is fabricated on a semiconductor substrate and is formed from multiple layers of doped regions and layers, metal layers, and polycrystalline silicon layers. The integrated circuit layout 200 includes logic cells 211, 212, and 213, cell 214, VDD power bus 220, VDD tap 225, antenna diodes 227, VSS power bus 230, VSS tap 235, sleep pin 240, sleep transistors 250, sleep bus 260, n+ diffusion 265 and abutting region 270. The integrated circuit layout 200 has height 280.

FIG. 2 depicts only three logic cells 211, 212, and 213 for the sake of simplicity. However, in other embodiments, integrated circuits may include a plurality of logic cells. Logic cell 211 is an example of the layout of logic cells in the integrated circuit layout 200. Other logic cells, such as logic cells 212 and 213, may have similar layouts and configurations as logic cell 211.

Logic cells are standard cells designed primarily to perform logic functions such as boolean operations. Logic cells may also perform a sequence of logic functions. Logic cells 211, 212, and 213 are configured to perform logic functions including, but not limited to, inverters, NOR gates, NAND gates, flip-flops, and adders. Logic cells 211, 212, and 213 are each coupled to VDD power bus 220 at the top portion of each logic cell. VDD tap 225 is also coupled to VDD power bus 220.

In various embodiments, sleep transistor 250 comprises a portion of an underlying n+ diffusion 265 overlaid by a portion of sleep bus 260. Sleep bus 260 is formed from a polycrystalline silicon layer. The combination of a portion of the underlying n+ diffusion 265 overlaid by a portion of sleep bus 260 forms a NMOS transistor, such as sleep transistor 250. The gate of sleep transistor 250 is formed by a portion of sleep bus 260 comprising the polycrystalline silicon layer. Logic cell 212 includes sleep transistor 251, which performs the same function as sleep transistor 250 in logic cell 211.

Sleep circuitry is any circuitry coupled to the logic cells and configured to receive a sleep signal from the sleep bus and to control the power consumption in the logic cells based on the sleep signal. Sleep circuitry in logic cell 212, for example, comprises sleep transistor 251 formed from a portion of underlying n+ diffusion 266 and a portion of sleep bus 260. Because of the limited space available and the kind of logic implemented in each of the logic cells 211, 212, and 213, the layout of the sleep circuitry varies within each logic cell.

In other embodiments, sleep circuitry may be implemented using PMOS transistors (not shown) by overlaying a polycrystalline silicon layer with a portion of an underlying p+ diffusion region (not shown). In these embodiments, sleep circuitry comprising PMOS transistors may be located adjacent to VDD power bus 220. FIGS. 2 through 7 and the related descriptions disclose sleep circuitry comprising of one or more NMOS transistors. FIG. 2, for example, discusses sleep circuitry with one NMOS transistor in each logic cell. In another embodiment discussed in FIG. 6 below, sleep circuitry with multiple NMOS transistors in a single logic cell is disclosed. In another embodiment discussed in FIG. 7 below, sleep circuitry with a single NMOS transistor shared among three logic cells is disclosed. However, one skilled in the art should understand that various embodiments include sleep circuitry comprising one or more PMOS transistors, and sleep circuitry comprising both NMOS and PMOS transistors.

Logic cells 211 and 212 are coupled to VSS power bus 230 through sleep circuitry comprising sleep transistors 250 and 251, thereby enabling sleep transistors 250 and 251 to control the power to logic cells 211 and 212. Sleep transistors 250 and 251 control the power to logic cells 211 and 212 in response to a sleep signal from sleep bus 260. Sleep pin 240 is coupled to sleep bus 260, and sleep pin 240 provides an external connection (not shown) for the sleep signal.

A sleep bus is any structure that is configured to distribute a sleep signal to the sleep circuitry in each of the logic cells. Sleep bus 260, for example, forms a continuous semiconductor layer that spans across each of the logic cells 211, 212, 213, and cell 214. Because the logic-cells 211, 212, and 213 are adjacent, sleep bus 260 is coupled to each of the logic cells 211, 212, and 213 by cell abutment. FIG. 2 depicts abutting region 270 that couples sleep bus 260 between logic cell 211 and logic cell 212.

Figure 1:
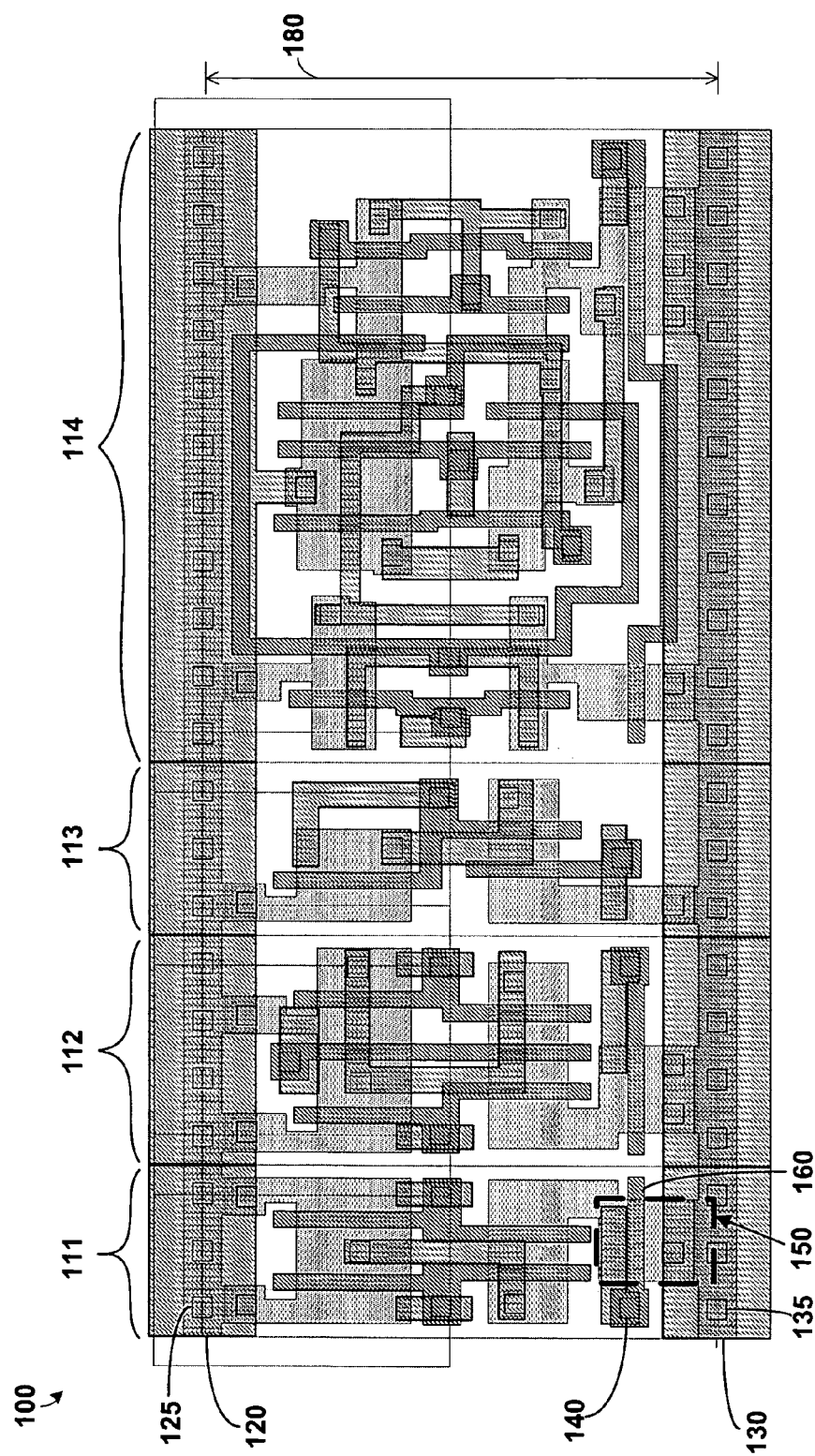
FIG. 1 is an illustration of an integrated circuit layout employing sleep circuitry in the prior art.

One advantage of the integrated circuit layout 200 is the reduced height and area of the logic cells. Sleep bus 260 and sleep transistors 250 and 251, for example, control the power to logic cells 211 and 212. Using sleep bus 260, a single VSS tap 235 can be placed in cell 214, instead of in every logic cell. In addition, instances of VDD tap 225 are removed from logic cells 211, 212, and 213, and a single VDD tap 225 is placed in cell 214. Thus, more space is available to implement logic functions in logic cells 211, 212, and 213, or optionally the overall size of the logic cells and thus the size of the integrated circuit may be reduced. In one embodiment, the height 280 and area of logic cells 211, 212 and 213 are approximately 11% less than the prior art of FIG. 1.

A second advantage of the integrated circuit layout 200 is the uncomplicated routing of the sleep bus during the integrated circuit design process. Sleep bus 260 may be routed like a power bus or a ground bus. In addition, using sleep bus 260 and locating VDD tap 225 and VSS tap 235 in cell 214 may utilize nine tracks to implement logic cells 211, 212, and 213. The height 280 of logic cells, such as logic cell 211, 212, and 213 may be characterized by the whole number of tracks required, depending on the need to route metal interconnects. In the prior art shown in FIG. 1, the addition of sleep circuitry requires a total of ten tracks because of the need to route a metal interconnect to couple to each instance of sleep pin 140, thus adding to the complexity of the layout. In one embodiment, the logic cells with sleep circuitry are reduced in height and area by approximately 11%. The integrated circuit layout 200 optionally includes antenna diodes 227 in cell 214 for electrostatic discharge protection during the semiconductor fabrication process.

A third advantage is that the performance of the logic cells with sleep circuitry is not degraded. Logic cells 211, 212, and 213 have a performance substantially similar or better than the prior art of FIG. 1 because more space is available for logic cells 211, 212, and 213 in the integrated circuit layout 200. In some embodiments, the NMOS transistors may be located lower in logic cells 211, 212, and 213 than the PMOS transistors. As the result of these factors, the delay times through logic cells 211, 212, and 213 are substantially similar or better than the prior art of FIG. 1.

Using cell abutment, a single polycrystalline silicon layer can be configured to distribute other signals to each of the logic cells 211, 212, and 213. In this embodiment, a signal bus distributes signals to a plurality of logic cells 211, 212, and 213.

In the embodiment shown in FIG. 2, VDD tap 225 for VDD power bus 220 is not located in each logic cell 211, 212, and 213. Instead, VDD tap 225 is located in cell 214. VDD power bus 220 couples to a supply of power through VDD tap 225. Sleep bus 260 also couples to sleep pin 240 in cell 214. In addition, VSS tap 235 is located in cell 214. Cell 214 is optionally placed every 25 microns or other spacing as required by the integrated circuit foundry.

Figure 3:
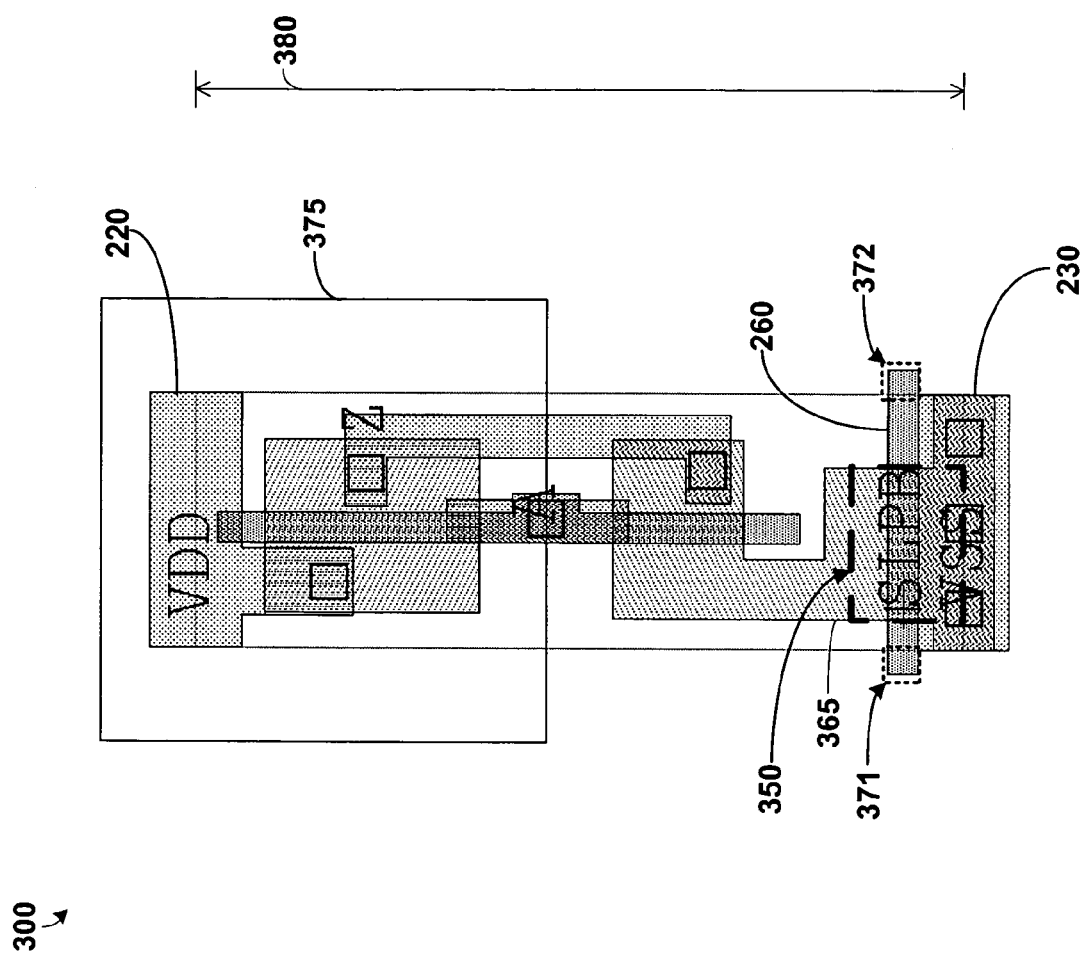
FIG. 3 is an illustration of an integrated circuit layout for an inverter logic cell in an exemplary implementation of the invention.

FIG. 3 is an illustration of an integrated circuit layout for an inverter logic cell 300, in an exemplary implementation of the invention. The inverter logic cell 300 comprises VDD power bus 220, VSS power bus 230, sleep transistor 350, sleep bus 260, n+ diffusion 365, left extended portion 371 of sleep bus 260, right extended portion 372 of sleep bus 260, and n-well 375. The inverter logic cell 300 has height 380.

Left extended portion 371 of sleep bus 360 and a right extended portion 372 of sleep bus 360 illustrate the cell abutment region. When at least two logic cells, such as any of logic cells 211, 212, 213, or inverter logic cell 300 are located adjacent to each other, sleep bus 260 spans across the logic cells. Sleep bus 260 thereby couples the at least two logic cells by cell abutment, and distributes the sleep signal to other sleep transistors, as discussed above. In this embodiment, the height 380 and area of the inverter logic cell 300 is approximately 11% less than the prior art of FIG. 1 because only nine tracks are required.

Figure 4:
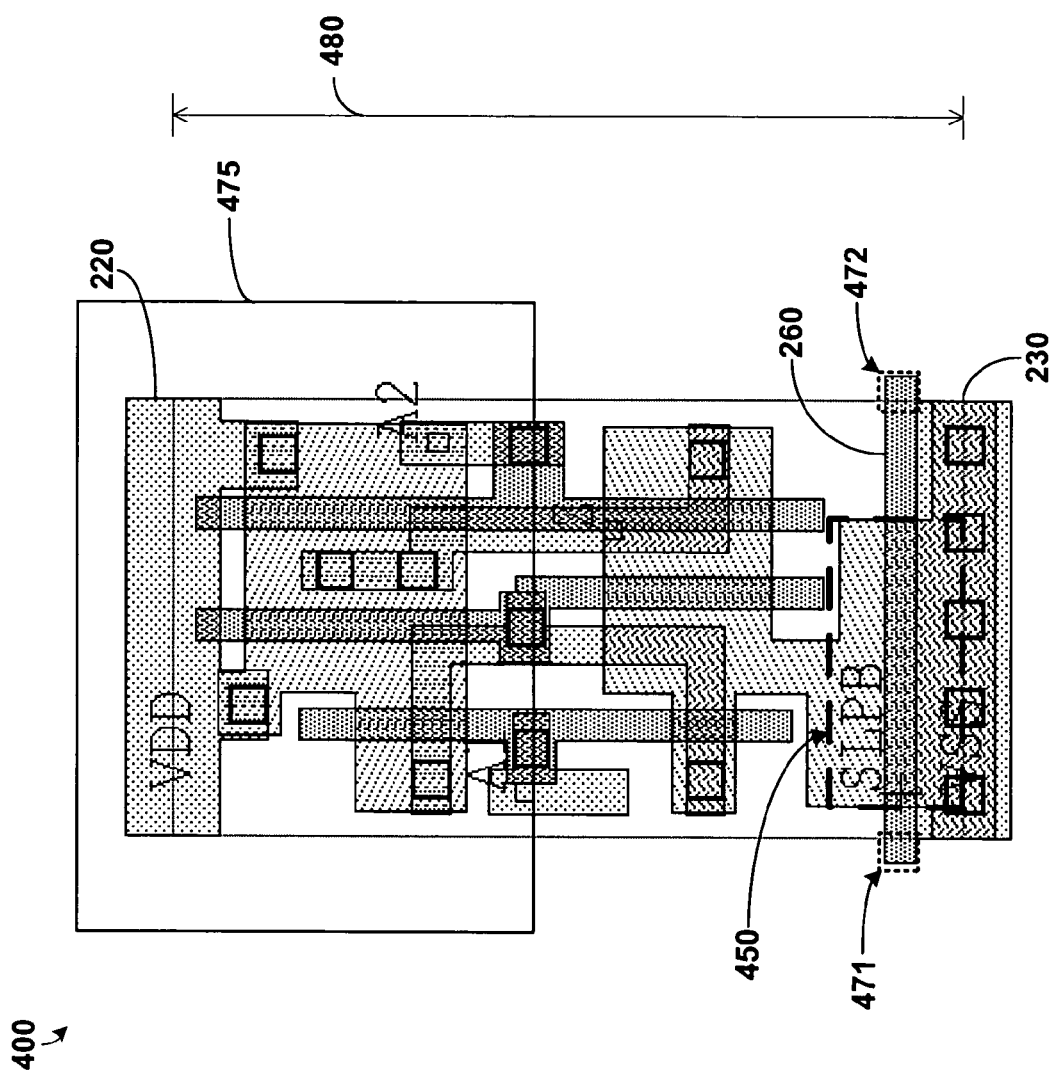
FIG. 4 is an illustration of an integrated circuit layout for an inverted input two-input NAND gate logic cell in an exemplary implementation of the invention.

FIG. 4 is an illustration of an integrated circuit layout for inverted input two-input NAND gate logic cell 400, in an exemplary implementation of the invention. Inverted input two-input NAND gate logic cell 400 includes VDD power bus 220, VSS power bus 230, sleep transistor 450, sleep bus 260, n-well 475, left extended portion 471 of sleep bus 260, and right extended portion 472 of sleep bus 260. Inverted input two-input NAND gate logic cell 400 has height 480.

FIG. 4 depicts sleep bus 260 comprising a left extended portion 471 of sleep bus 260 and right extended portion 472 of sleep bus 260 to illustrate the cell abutment region. In this embodiment, the height 480 is approximately 11% less than the prior art of FIG. 1 because only nine tracks are required. Thus, the area of the inverted input two-input NAND gate 400 reduced by approximately 11%, as compared with the prior art of FIG. 1.

Figure 5:
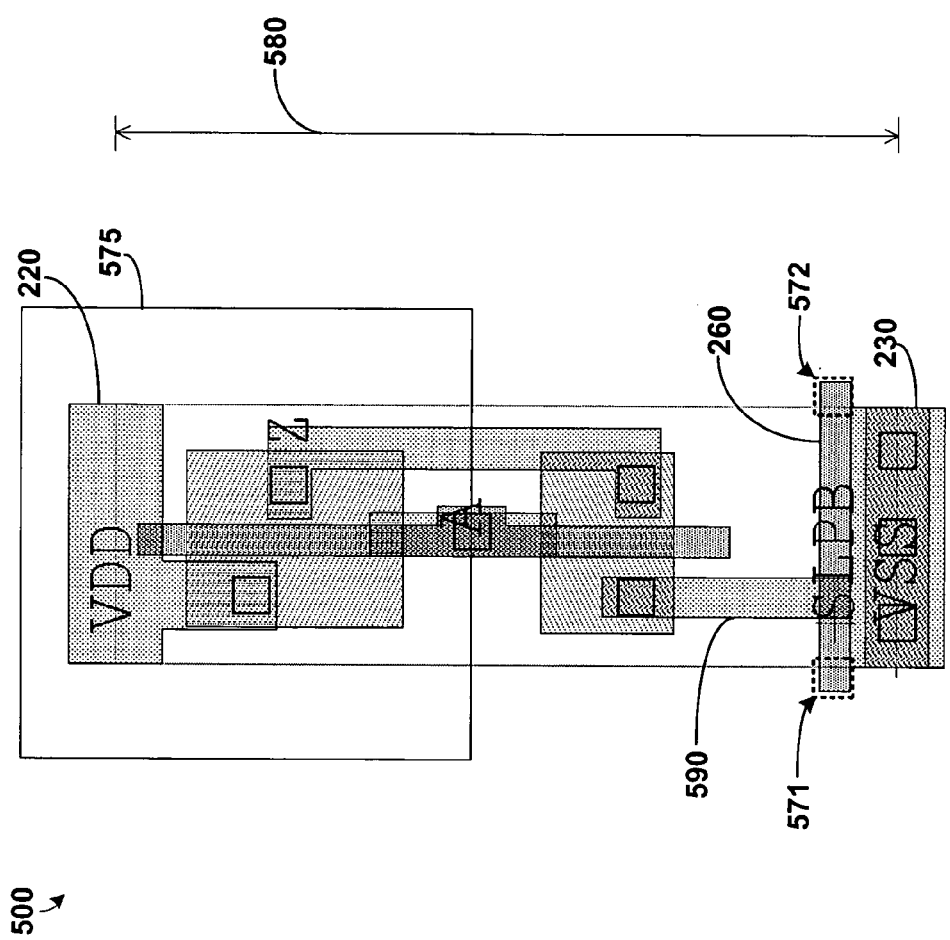
FIG. 5 is an illustration of an integrated circuit layout for a non-sleep inverter logic cell that is bypassed by the sleep bus in an exemplary implementation of the invention.

FIG. 5 is an illustration of an integrated circuit layout for a non-sleep inverter logic cell 500. Non-sleep inverter logic cell 500 is bypassed by sleep bus 260 in an exemplary implementation of the invention. In various embodiments, integrated circuits may require logic cells which require continuous power. Non-sleep inverter logic cell 500 is one such example. Non-sleep inverter logic cell 500 does not employ a sleep transistor.

FIG. 5 depicts a single non-sleep inverter logic cell 500 for simplicity. Non-sleep inverter logic cell 500 comprises VDD power bus 220, VSS power bus 230, sleep bus 260, left extended portion 571 of sleep bus 260, right extended portion 572 of sleep bus 260, n-well 575, and VSS power coupling 590. The non-sleep inverter logic cell 500 has height 580. Height 580 may be approximately equal to height 380 of the inverter logic cell 300.

FIG. 5 depicts sleep bus 260 comprising a left extended portion 571 and a right extended portion 572 to illustrate the cell abutment region. As contrasted to the inverter logic cell 300, shown in FIG. 3, the embodiment of the non-sleep inverter logic cell 500 does not contain a sleep transistor, such as sleep transistor 350.

Non-sleep inverter logic cell 500 does not contain an n+ diffusion underlying sleep bus 260, such as n+ diffusion 365, and thus no sleep transistor is formed. Sleep bus 260 does not couple to VSS power coupling 590. Sleep bus 260 passes over, or bypasses, VSS power coupling 590. In this embodiment, sleep bus 260 distributes the sleep signal across the non-sleep inverter logic cell 500 to adjacent logic cells, without receiving the sleep signal within the non-sleep inverter logic cell 500.

Figure 6:
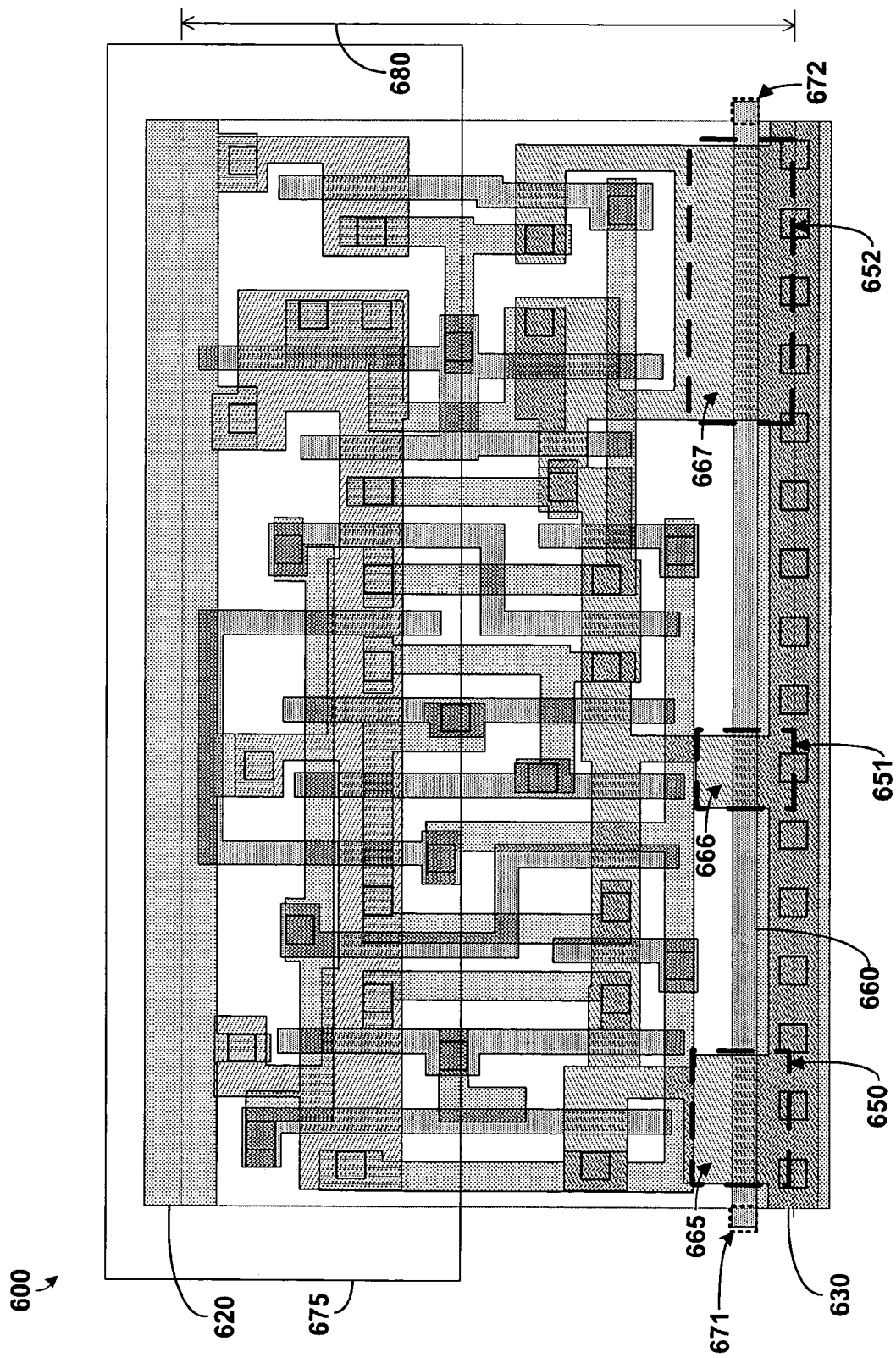
FIG. 6 is an illustration of an integrated circuit layout for a flip-flop logic cell in an exemplary implementation of the invention.

FIG. 6 is an illustration of an integrated circuit layout for flip-flop logic cell 600, in an exemplary implementation of the invention. Flip-flop logic cell 600 includes VDD power bus 620, VSS power bus 630, sleep transistors 650, 651, and 652, sleep bus 660, n-well 675, left extended portion 671 of sleep bus 660, right extended portion 672 of sleep bus 660, and n+ diffusion 665, 666, and 667. FIG. 6 illustrates one embodiment of the invention in which more than one sleep transistor is employed within a single logic cell. For example, sleep transistors 650, 651, and 652 are all contained in flip-flop logic cell 600. Flip-flop logic cell 600 has height 680.

FIG. 6 depicts sleep bus 660 comprising a left extended portion 671 of sleep bus 660 and right extended portion 672 of sleep bus 660 to illustrate the cell abutment region. In this embodiment, the height 680 is approximately 11% less than the prior art of FIG. 1.

Figure 7:
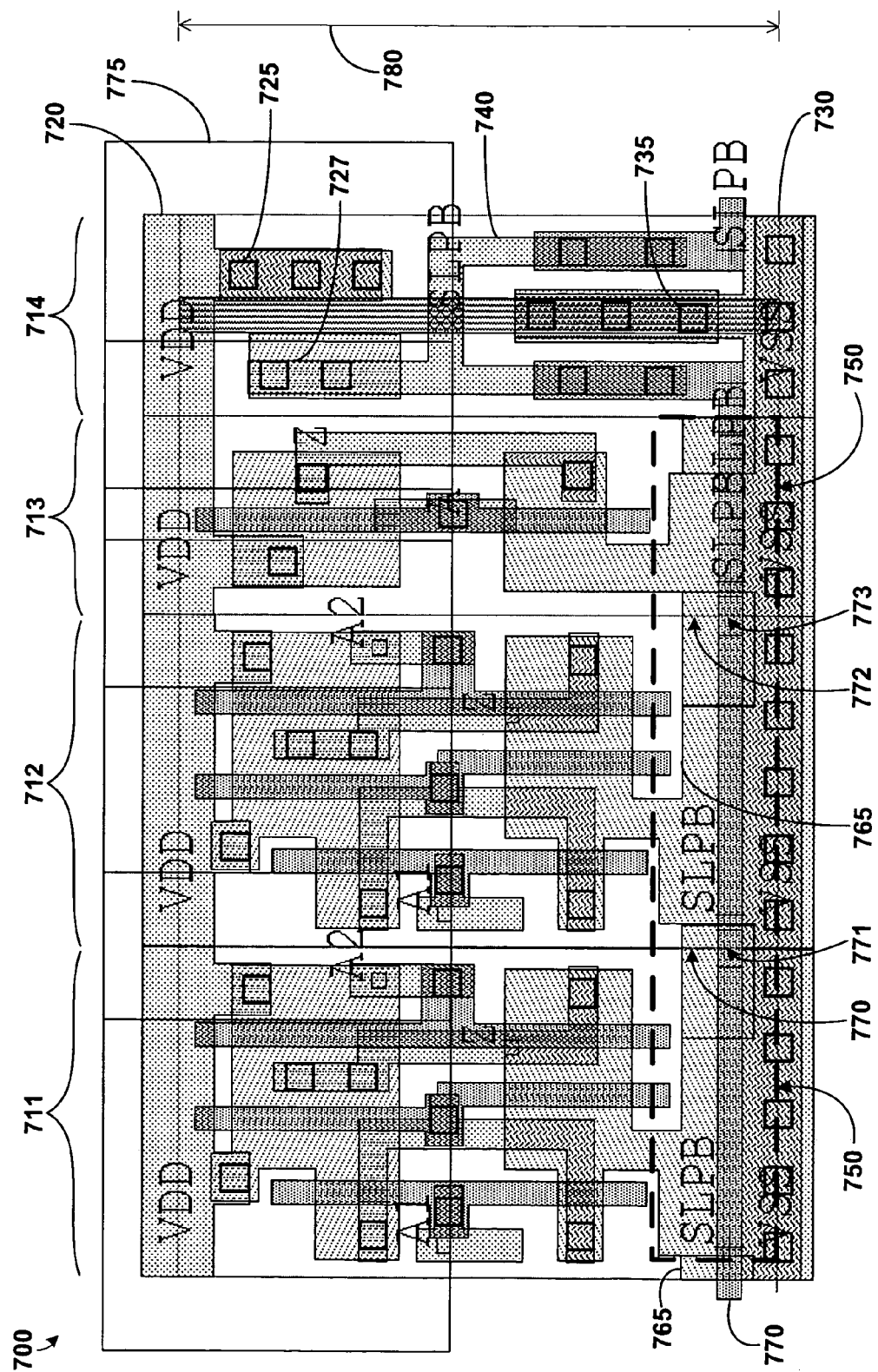
FIG. 7 is an illustration of an integrated circuit layout employing a shared sleep transistor in an exemplary implementation of the invention.

FIG. 7 is an illustration of an integrated circuit layout 700 employing a shared sleep transistor in an exemplary implementation of the invention. The integrated circuit layout 700 is fabricated on a semiconductor substrate and is formed from multiple layers of doped regions and layers, metal layers, and polycrystalline silicon layers. Integrated circuit layout 700 includes logic cells 711, 712, and 713, cell 714, VDD power bus 720, VDD tap 725, antenna diodes 727, VSS power bus 730, VSS tap 735, sleep pin 740, shared sleep transistor 750, sleep bus 760, extended drain 765, abutting region 770, abutting region 771, and n-well 775. Integrated circuit layout 700 has height 780. In other embodiments using cell abutment, a single polycrystalline silicon layer can be configured to distribute signals to each of the logic cells 711, 712, and 713. In these embodiment, a signal bus distributes signals to a plurality of logic cells 711, 712, and 713.

FIG. 7 depicts only three logic cells 711, 712, and 713 for the sake of simplicity. However, in other embodiments, integrated circuits may include a plurality of logic cells. Logic cell 711 is an example of the layout of logic cells in the integrated circuit layout 700. Other logic cells, such as logic cells 712 and 713, have similar layouts and configurations.

Logic cells 711, 712, and 713 are configured to perform logic functions including, but not limited to, inverters, NOR gates, NAND gates, flip-flops, and adders. Logic cells 711, 712, and 713 are each coupled to VDD power bus 720 at the top portion of each logic cell. VDD tap 725 is coupled to VDD power bus 720.

Logic cells 711, 712, and 713 are coupled to VSS power bus 730 through extended drain 765 and shared sleep transistor 750, thereby enabling shared sleep transistor 750 to control power to logic cells 711, 712, and 713. Shared sleep transistor 750 controls the power to logic cells 711, 712, and 713 in response to a sleep signal from sleep bus 760.

In various embodiments, shared sleep transistor 750 comprises a portion of an underlying n+ diffusion forming extended drain 765. Extended drain 765 spans across at least two logic cells and is overlaid by a portion of sleep bus 760. Sleep bus 760 is formed from a polycrystalline silicon layer. The combination of extended drain 765 overlaid by sleep bus 760 forms a single NMOS transistor, such as shared sleep transistor 750, which is shared by logic cells 711, 712 and 713. The gate of shared sleep transistor 750 is formed by a portion of sleep bus 760 comprising the polycrystalline silicon layer.

In other embodiments, a shared sleep transistor, similar to shared sleep transistor 750, may be implemented using PMOS transistors (not shown) by overlaying a polycrystalline silicon layer with a portion of an underlying p+ diffusion region (not shown). In these embodiments, the shared sleep transistor may be located adjacent to VDD power bus 620.

Sleep bus 760 is formed by cell abutment because logic cells 711, 712, and 713 are adjacent. In the same fashion, extended drain 765 is formed by cell abutment. FIG. 7 depicts abutting regions 770 and 771 between logic cell 711 and logic cell 712, and abutting regions 772 and 773 between logic cell 712 and logic cell 713. Thus, for example, sleep bus 760 spans across logic cells 711 and 712 and is coupled at abutting region 771. In the same way, extended drain 765 spans across logic cells 711 and 712 and is coupled at abutting region 770. Because of the limited space available and the kind of logic circuitry implemented in each of the logic cells 711, 712, and 713, the layout of extended drain 765 varies within each logic cell 711, 712, and 713. Sleep pin 740 is coupled to sleep bus 760, and sleep pin 740 provides an external connection (not shown) for the sleep signal.

Cell 714 couples VDD power bus 720 to a supply of power through VDD tap 725. VSS tap 735 couples power to VSS bus 730. Cell 714 also couples sleep bus 760 to sleep pin 740. In the embodiment shown in FIG. 7, VDD tap 725 for VDD power bus 720 is not located in each logic cell 711, 712, and 713. Instead, a single VDD tap 725 is located in cell 714. In addition, VSS tap 735 is located in cell 714. The integrated circuit layout 700 optionally includes antenna diodes 727 for electrostatic discharge protection during the semiconductor fabrication process. Cell 714 is optionally placed every 25 microns or other spacing as required by the integrated circuit foundry.

By removing instances of VDD tap 725 and VSS tap 735 from logic cells 711, 712, and 713, and placing a single VDD tap 725 and a single VSS tap 735 in cell 714, more space is provided to implement logic functions in logic cells 711, 712, and 713. In this embodiment, the height 780 and area of logic cells 711, 712 and 713 is approximately 11% less than the prior art.

The combination of sleep bus 760 and extended drain 765 forming shared sleep transistor 750 has the advantage of requiring a smaller area on the integrated circuit than do the sleep transistors in the prior art. A single shared sleep transistor 760 also improves the delay time through each logic cell 711, 712, and 713. In addition, the integrated circuit layout 700 advantageously does not employ a virtual ground bus. A virtual ground bus may cause performance degradation due to resistance, and can suffer from the phenomena of electro-migration, which limits the long term reliability of integrated circuits.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

The invention claimed is:

1. An integrated circuit comprising:
    at least two logic cells; and
    a sleep signal bus formed by cell abutment of the at least two logic cells and configured to receive a sleep signal and distribute the sleep signal to each of the at least two logic cells.

2. The integrated circuit of claim 1 wherein the sleep signal bus spans across the at least two logic cells.

3. The integrated circuit of claim 1 wherein the sleep signal bus is formed from a conductive layer.

4. The integrated circuit of claim 3 wherein the conductive layer comprises a polycrystalline silicon layer.

5. The integrated circuit of claim 1 further comprising a sleep pin coupled to the sleep signal bus and configured to receive the sleep signal.

6. The integrated circuit of claim 1 further comprising sleep circuitry coupled to the at least two logic cells and configured to receive the sleep signal from the sleep signal bus and to control power consumption in the at least two logic cells based on the sleep signal.

7. The integrated circuit of claim 6 wherein the sleep circuitry comprises one or more sleep transistors.

8. The integrated circuit of claim 7 wherein a drain of the one or more sleep transistors is formed from a semiconductor layer.

9. The integrated circuit of claim 7 wherein the one or more sleep transistors comprise NMOS transistors.

10. The integrated circuit of claim 7 wherein the one or more sleep transistors comprise PMOS transistors.

11. A method comprising:
   receiving a sleep signal using a sleep signal bus formed by cell abutment of at least two logic cells; and
   distributing the sleep signal to each of the at least two logic cells.

12. The method of claim 11 wherein the sleep signal bus spans across the at least two logic cells.

13. The method of claim 11 wherein distributing the sleep signal comprises using the sleep signal bus formed from a conductive layer.

14. The method of claim 13 wherein the conductive layer comprises a polycrystalline silicon layer.

15. The method of claim 11 further comprising receiving the sleep signal from a sleep pin coupled to the sleep signal bus.

16. The method of claim 11 wherein distributing the sleep signal comprises using sleep circuitry configured to control the power consumption in the at least two logic cells.

17. The method of claim 16 wherein the sleep circuitry comprises one or more sleep transistors.

18. The method of claim 17 wherein a drain of the one or more sleep transistors is formed from a semiconductor layer.

19. The method of claim 17 wherein the one or more sleep transistors comprise NMOS transistors.

20. The method of claim 17 wherein the one or more sleep transistors comprise PMOS transistors.

21. A standard cell library comprising:
   at least two logic cells; and
   a sleep signal bus formed by cell abutment of the at least two logic cells and configured to receive a sleep signal and distribute the sleep signal to each of the at least two logic cells.

22. The standard cell library of claim 21 further comprising sleep circuitry coupled to the at least two logic cells.

23. The standard cell library of claim 22 wherein said sleep circuitry is configured to receive the sleep signal from the sleep signal bus and to control power consumption in the at least two logic cells based on the sleep signal.

* * * * *